United States Patent [19]
Cherny et al.

[11] Patent Number: 5,590,966
[45] Date of Patent: Jan. 7, 1997

[54] SELF-ALIGNING SHAFT SUPPORT

[75] Inventors: Dmitry Cherny; Nicolai Cherny; Dimitry Cherny, all of Maddington, Australia

[73] Assignee: Cherny Holdings Limited, Maddington, Australia

[21] Appl. No.: 522,393

[22] Filed: Sep. 15, 1995

[30] Foreign Application Priority Data

Mar. 17, 1993 [AU] Australia .................................. PL 7860

[51] Int. Cl.$^6$ ..................................................... F16C 31/02
[52] U.S. Cl. ................................................. 384/16; 384/38
[58] Field of Search ............................. 384/38, 212, 211, 384/208, 209, 206, 16

[56] References Cited

U.S. PATENT DOCUMENTS

| | | | |
|---|---|---|---|
| 2,592,566 | 4/1952 | Heim | 384/212 |
| 4,729,145 | 3/1988 | Egner-Walter et al. | 384/38 |
| 4,773,112 | 9/1988 | Egner-Walter et al. | 384/38 |
| 4,993,739 | 2/1991 | Putnam | 384/212 |

*Primary Examiner*—Lenard A. Footland
*Attorney, Agent, or Firm*—Leydig, Voit & Mayer, Ltd.

[57] ABSTRACT

This invention relates to a support assembly which is to be used in association with a sealing arrangement to support a member which is movable with respect to a base element.

16 Claims, 1 Drawing Sheet

SELF-ALIGNING SHAFT SUPPORT

This invention relates to a support assembly which is to be used in association with a sealing arrangement to support a member which is movable with respect to a base element.

An example of an application of the invention relates to a support assembly which may be used to support the pull rod of a pump assembly adjacent the seal for the pull rod. Another example comprises supporting a rotating shaft adjacent a seal.

A difficulty which exists in relation to the support provided for members which are movable with respect to a base, such as rotating shafts or reciprocating pull rods, comprises the difficulty in providing an adequate seal where a rotating or reciprocating member is caused to undergo relative lateral or angular displacement with respect to the housing in the region of the seal. This circumstance can occur in relation to a rotating shaft where the shaft has been misaligned or is bent which causes one portion of the shaft to "orbit" around its central axis during the rotation cycle. In the case of the pull rod of a pump difficulty arises where the drive means which is causing reciprocation of the pull rod is out of alignment with the central axis of the pump head or where because of the nature of the drive means the pump rod is caused to be flexed out of alignment during each stroke of the drive means.

In the past a variety of support arrangements have been proposed for accommodating for lateral or angular displacement of a movable member with respect to a housing, however these arrangements have not proved to be satisfactory where the movable member may be subjected to heavy tensional loads as in the case where a pump pull rod or high differential fluid pressures acts on the support assembly or seal.

An example of a support arrangement is disclosed in Australian patent specification 625322 which discloses a guide for a movable shaft which accommodates for lateral and angular displacement of a pump pull rod with respect to a housing. It has been found however that while this arrangement has in many cases proved to be satisfactory where that assembly has been subjected to high load as a result of fluid pressure within the wellhead high point loadings have been established between the bearing member and the bearing rings of the assembly which has limited the freedom of movement between the bearing member and the housing.

It is an object of this invention to provide a guide means for supporting a mobile member from a base which is able to accommodate for both relative lateral and angular displacement of the movable member in respect to the base under high pressure conditions.

In one form the invention resides in a guide for supporting a first member in a housing where said first member is capable of rotational and reciprocal movement relative to the housing wherein said first member may be also capable of lateral and angular displacement relative to the housing; said guide comprising a bearing housing having a first and second axial face in substantially opposed relation to each other, said bearing housing supporting a guide element, said guide element comprising a central member having an axial passage formed through it which is adapted to sealingly receive the first member to permit said rotational and reciprocal movement, said guide member further comprising a substantially annular flange element which is received within the bearing housing between the first and second axial face thereof, said guide member being supported from the first and second axial face by a pair of annular bearing elements, one bearing element being located between one axial face of the flange element and the first axial face of the bearing chamber, the other bearing element being located between the other axial face of the flange element and the second axial face of the bearing chamber, the opposed faces of the bearing elements being substantially parallel and slidably receiving the flange element between them to permit relative lateral movement between the guide member and the bearing chamber, the axial faces of the bearing housing and the abutting face of the respective bearing elements being of a substantially spherical configuration to enable angular displacement of the bearing elements relative to the bearing housing.

According to a preferred feature of the invention the radius of the spherical surface of each bearing element is equal. In addition it is preferred that the central axis of each spherical surface is located on the central axis of the central member. Furthermore the central axis of the spherical surface of each bearing element may be displaced from each other along said central axis.

According to a further preferred feature of the invention sealing means is provided between the guide member and the bearing elements to prevent the passage of fluid from one side of the support assembly to the other. It is preferred that the sealing means comprise a seal provided on the abutting faces of the flange element and bearing element and the axial faces of the bearing housing and the respective bearing element. According to a preferred feature the sealing element may be provided between one bearing element and the respective face of the flange element and axial face of the bearing housing only. In such a case the other bearing element may be modified to permit fluid flow across the bearing element into the bearing housing.

The invention will be more fully understood in the light of the following description of one specific embodiment.

BRIEF DESCRIPTION OF THE DRAWING

The description is made with reference to the accompanying drawing which is a schematic sectional elevation of a support arrangement according to the embodiment.

The embodiment is directed to a support arrangement for supporting a pump pull rod 11 which is to be supported from a housing 10. The embodiment has particular application where the pull rod 11 is likely, during its working life, of becoming misaligned with the central axis of the bore hole to accommodate for relative lateral and angular displacement of the pull rod relative to the support housing 12 as a result of such misalignment. In the past it has been found that the forces which are created by misalignment of the pull rod 11 can be particularly destructive to the sealing arrangement provided on a housing 12.

Figure 1:
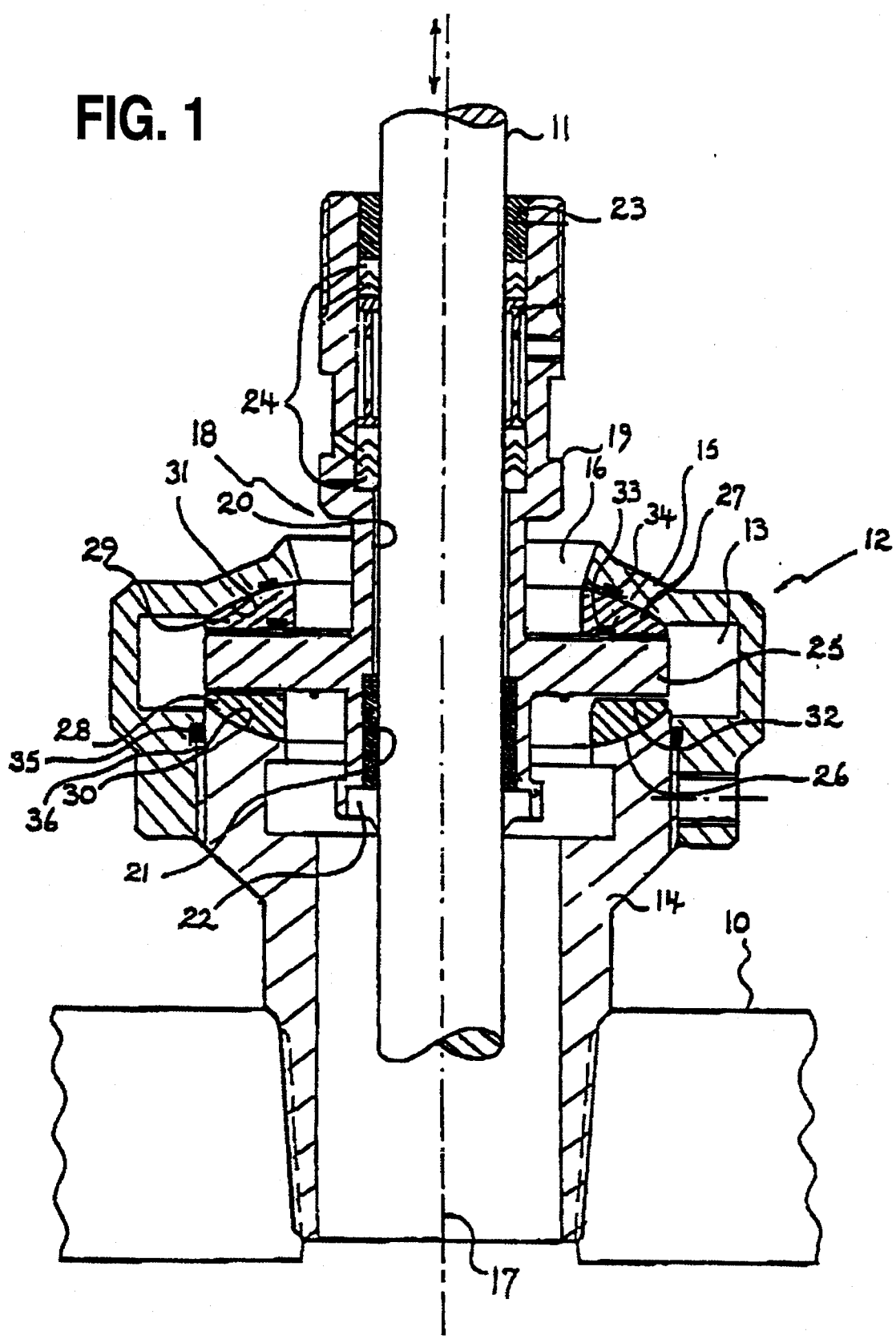

The embodiment comprises a bearing housing which defines a bearing chamber 13. The bearing housing comprises a base 14 which is of substantially tubular configuration and a cap member 15 which is threadably supported upon the base 14 where the bearing chamber 13 is defined between the outermost end of the base member 14 of the interior of the cap member 15. A seal 35 in the form of an O-ring is supported from the upper portion of the base 14 by a washer 36 to be sealingly engaged by the cap member 15 when received over the base. The seal serves to seal the bearing chamber 13. The base member 14 is adapted to be supported at its innermost end from the housing 12. The cap member 15 is formed with a central aperture 16 which is of substantially corresponding diameter to the bore of the base 14. In this regard the diameter of the aperture 16 and the bore of the base 14 exceeds that of the pull rod 11 to provide sufficient clearance therebetween to accommodate for lateral movement of the pull rod 11 with respect to the central axis 17 of the borehole. The support assembly further comprises a guide member 18 which comprises a central element 19 having a tubular configuration having a bore 20 the diameter of which corresponds substantially with the diameter of the pull rod 11. The bore has a central axis 17. The central member 19 of the guide member 18 extends into the bore of the base 14 and is provided at its innermost end with a first bush 21 which slidably supports the pull rod 11 and a seal 22. The outermost end of the central member 19 supports a second bush 23 and a seal or stuffing box 24 which may take any form which is desired to slidably and sealingly accommodate the pull rod 11.

The guide member 18 further comprises an annular flange element 25 which is received within the bearing chamber 13 between one end of the base 14 and the cap 15 where the one end of the base 14 provides a first axial face 26 and the inner axial face of the cap member 15 provides a second axial face 27. The axial faces of the flange element 25 are substantially parallel to each other and are perpendicular to the central axis 17 of the central member 19. The flange element 25 of the guide member 18 is supported within the bearing chamber 13 by a first and second bearing element 28 and 29 where the first bearing element 28 is received between the first axial face of the flange element 25.

The other bearing element 29 is received between the second axial face 27 of the bearing chamber 13 and the opposed axial face of the flange element 25. The opposed axial faces of each bearing element 28 and 29 are substantially parallel and are spaced relative to each other to slidably receive between them the flange element 25 to permit movement of the flange element 25 perpendicular to the central axis 17 of the central member 19.

The outermost axial faces of each bearing element 30 and 31 respectively which are in abutting relationship with the first and second axial faces 26 and 27 of the bearing chamber 13 are of a spherical configuration and the respective first and second axial faces of the bearing chamber 13 are of complementary configuration. The radii of the outer axial face of each bearing element are substantially equal and the center of curvature of each is located on the central axis 17 of the central member 19 where the center of curvature of each spherical surface is spaced from each other along the central axis 17. As a result of the spherical configuration of the outer axial faces 30 and 31 of the bearing elements and the complementary configuration of the respective axial faces 26 and 27 of the bearing chamber 13, the bearing elements are capable of rotation about their centers of curvature to permit angular displacement of the guide member with respect to the bearing chamber.

To facilitate lubrication of the bearing surfaces of the support assembly between the flange element and the bearing elements and between each of the bearing elements and the axial faces of the bearing chamber the bearing chamber may be filled with a lubricant and suitable seals may be provided on the opposed faces of the bearing elements and flange elements and of the bearing element and the respective axial faces of the bearing chamber 13.

In the case of the embodiment shown in the drawing provision is made to facilitate lubrication of the bearing surfaces using the medium which is being pumped from the borehole. Such fluid would be present within the space defined between the bore of the base 14 and the pull rod 11. To facilitate the passage of such fluid into the bearing chamber 13 the innermost bearing element 28 is provided with suitable ports 32 which extend radially across the bearing element to permit communication between the interior of the bearing chamber 13 and in the space defined between the internal bore of the base 14 and the pull rod 11. Such ports 32 are provided by radial grooves formed across the face of the bearing element which is in engagement with the flange element 25. Alternatively the ports 32 may comprise radial passageways formed through the body of the bearing element 28. As a result of the presence of the ports 32, the liquid which is being conveyed up through the bore hole is permitted to enter the bearing chamber 13 in order to facilitate the lubrication of the abutting faces. In such an arrangement however, suitable seals 33 and 34 must be provided between the outermost ring element 29 and the flange element 25 and second axial face 27 of the bearing chamber 13 to prevent the escape of fluid from the bearing chamber 13.

In addition to providing lubrication for the guide member the presence of the fluid in the bearing chamber 13 also serves to pressurize the bearing chamber 13 to reduce the pressure differential which would otherwise exist between the opposed axial faces of the innermost bearing element 26 and thus the frictional loadings that would otherwise be created between the bearing elements and the flange element.

If desired the space defined in the bearing chamber at the outer radial face of the flange element and bearing elements may be pressurized to counterbalance the pressure within the borehole. This pressurization can be effected by utilization of the liquid being pumped from the borehole or by a suitable hydraulic fluid or by a gaseous medium.

The embodiment provides a means of supporting a reciprocating pull rod which is subject to cyclical displacement of the pull rod 11 laterally and angularly due to misalignment of the pull rod from the bore hole and the central axis of the bore hole and which serves to reduce the stresses which would otherwise be exerted on the seal for the pull rod and also stresses which can be exerted on the pull rod itself as a result of such misalignment.

In addition, the embodiment will have application to a circumstance where it is necessary to sealingly support a shaft which is capable of rotation about its central axis.

It should be appreciated that the scope of the present invention should not be limited to the particular scope of the embodiment described above.

The following invention is claimed:

1. An apparatus for controlling the movement of a shaft, comprising:

a housing having an axis through the interior space of said housing and having a first axial face and a second axial face within the interior space of said housing;

a guide located within aid housing and having an axial passage for controlling the shaft in a direction substantially parallel to the axis of said housing, and wherein said guide permits reciprocation and rotation of the shaft within the axial passage through said guide;

a flange connected to said guide in a plane substantially perpendicular to the axial passage through said guide; and a bearing in contact between said flange and the first axial face and the second axial face of said housing, wherein said bearing permits said flange to move within said housing in a direction substantially transverse to the axis of said housing, and wherein said bearing further permits said guide to move within said housing in an angular direction relative to the axis of said housing.

2. An apparatus as recited in claim 1, further comprising a seal between the shaft and the axial passage of said guide.

3. An apparatus as recited in claim 2, wherein the shaft comprises a pull rod and said seal comprises a stuffing box.

4. An apparatus as recited in claim 1, wherein said flange contacts two axial surfaces of said bearing.

5. An apparatus as recited in claim 4, wherein said two axial surfaces of said bearing are substantially parallel.

6. An apparatus as recited in claim 1, wherein said bearing comprises a first bearing in contact with the first axial face of said housing, and further comprises a second bearing in contact with the second axial face of said housing.

7. An apparatus as recited in claim 6, wherein said first bearing and said second bearing have substantially parallel axial surfaces in contact with said flange.

8. An apparatus as recited in claim 6, wherein the first axial face and the second axial face of said housing are spherical to permit angular movement of said guide relative to the axis of said housing.

9. An apparatus as recited in claim 8, wherein each spherical radius of the first axial face and of the second axial face of said housing are substantially equal.

10. An apparatus as recited in claim 6, further comprising at least one aperture through said first bearing to permit the equalization of pressure within said housing.

11. An apparatus as recited in claim 6, further comprising a seal between the said first bearing and the first axial face of said housing.

12. An apparatus as recited in claim 1, further comprising at least one aperture through said bearing to permit the equalization of pressure within said housing.

13. An apparatus as recited in claim 1, wherein said flange is shaped as an annular ring about said guide.

14. An apparatus as recited in claim 1, further comprising a seal located between said flange and said bearing.

15. An apparatus as recited in claim 1, further comprising a seal located between said bearing and said housing.

16. An apparatus as recited in claim 1, further comprising at least one bushing between the shaft and said guide to center the shaft within the axial passage of said guide.

* * * * *